US010079623B2

United States Patent
Li et al.

(10) Patent No.: US 10,079,623 B2
(45) Date of Patent: Sep. 18, 2018

(54) COORDINATED BEAMFORMING METHOD AND APPARATUS BASED ON PARTIAL INTERFERENCE ALIGNMENT

(71) Applicant: ZTE CORPORATION, Shenzhen, Guangdong Province (CN)

(72) Inventors: Bin Li, Shenzhen (CN); Guomei Zhang, Shenzhen (CN); Xuelei Lv, Shenzhen (CN); Guobing Li, Shenzhen (CN); Hongfeng Qin, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 48 days.

(21) Appl. No.: 15/109,820

(22) PCT Filed: Jul. 17, 2014

(86) PCT No.: PCT/CN2014/082425
§ 371 (c)(1),
(2) Date: Jul. 6, 2016

(87) PCT Pub. No.: WO2015/101017
PCT Pub. Date: Jul. 9, 2015

(65) Prior Publication Data
US 2016/0337008 A1    Nov. 17, 2016

(30) Foreign Application Priority Data
Jan. 6, 2014    (CN) .......................... 2014 1 0005816

(51) Int. Cl.
*H04B 7/02*    (2018.01)
*H04B 7/00*    (2006.01)
(Continued)

(52) U.S. Cl.
CPC ........... *H04B 7/024* (2013.01); *H04B 7/0456* (2013.01); *H04B 7/26* (2013.01); *H04B 15/00* (2013.01)

(58) Field of Classification Search
CPC .... H04B 7/024; H04B 7/0617; H04B 7/0456; H04B 7/0632; H04B 7/0413; H04B 7/026;
(Continued)

(56) References Cited

U.S. PATENT DOCUMENTS 5,493,403 A * 2/1996 Nishi ........................ G03F 9/70
                                                              356/401
6,518,917 B1 * 2/2003 Durfee ..................... G01S 7/282
                                                              342/159
(Continued)

FOREIGN PATENT DOCUMENTS

| CN | 101908948 A | 12/2010 |
|---|---|---|
| CN | 103269238 A | 8/2013 |
| WO | WO2012152065 A1 | 11/2012 |

OTHER PUBLICATIONS

XP032161903; An Optimized Cooperative Interference Alignment Algorithm for MIMO Interference Channel; Xu Bing et al. Chongqing University of Posts and Telecommunications, Chongqing, China. 2011 international Conference on Computer Science and Network Technology. Dec. 24-26, 2011.
(Continued)

*Primary Examiner* — Sarah Hassan
(74) *Attorney, Agent, or Firm* — Ling Wu; Stephen Yang; Ling and Yang Intellectual Property

(57) ABSTRACT

A coordinated beamforming method and apparatus based on partial interference alignment, the method includes: selecting an optimal partial interference alignment mode from selectable partial interference alignment modes of terminals covered by base stations in a coordinating cluster of a coordinated multiple points transmission according to a chordal distance criterion; and transmitting, by the base (Continued)

stations, signals to the terminals by adopting the optimal partial interference alignment mode.

14 Claims, 11 Drawing Sheets

(51) Int. Cl.
    *H04B 7/024* (2017.01)
    *H04B 7/26* (2006.01)
    *H04B 7/0456* (2017.01)
    *H04B 15/00* (2006.01)

(58) Field of Classification Search
    CPC .. H04B 7/0404; H04B 7/0658; H04B 7/0695; H04B 7/26; H04B 7/2606
    USPC .......................................... 375/267; 370/277
    See application file for complete search history.

(56) References Cited

U.S. PATENT DOCUMENTS

| | | | | |
|---|---|---|---|---|
| 8,488,728 | B2* | 7/2013 | Maddah-Ali | H04L 25/03343 375/350 |
| 2011/0151872 | A1* | 6/2011 | Kwon | H04W 72/048 455/435.2 |
| 2012/0046038 | A1* | 2/2012 | Gao | H04W 28/16 455/447 |
| 2012/0257860 | A1* | 10/2012 | Li | G02B 6/3858 385/83 |
| 2013/0114468 | A1* | 5/2013 | Hui | H01Q 3/2611 370/277 |
| 2013/0301746 | A1* | 11/2013 | Mobasher | H04B 7/0456 375/267 |
| 2014/0036815 | A1* | 2/2014 | Lei | H04B 7/0456 370/329 |

OTHER PUBLICATIONS

XP032599998; Distributed Interference Alignment with Limited Feedback for Cellular Networks. Jan Schreck et al. Berlin, Germany. Globecom 2013 workshop—Emerging Technologies for LTE-Advanced and Beyond-4G.

* cited by examiner

COORDINATED BEAMFORMING METHOD AND APPARATUS BASED ON PARTIAL INTERFERENCE ALIGNMENT

TECHNICAL FIELD

The present document relates to the field of coordinated multiple points transmission in wireless communication, in particular to a coordinated beamforming method and apparatus based on partial interference alignment.

BACKGROUND OF THE RELATED ART

Coordinated beamforming is a coordinated multiple points transmission mode, under which adjacent cells do not need to share data and mutually share interference channel information only through interfaces between base stations, each node only provides service for terminals in a coverage area and the influence of inter-cell interference is reduced through an interference coordination method. Coordinated beamforming is an important branch of a coordinated multiple points transmission technology and provides a compromise solution between backhaul overhead and system performance. Compared with joint processing, coordinated beamforming only needs to share channel state information between base stations, thus can coordinate and suppress inter-cell interference through methods such as transmission and receiving beam optimization, power control and user scheduling, etc, and can be easily implemented under the existing network architecture. As proved by researches, when the number of terminals in a system is enough, the system performance can be obviously improved through this interference coordination method.

Coordinated beamforming solutions mainly include a coordinated beamforming solution based on a duality theory and a coordinated beamforming solution based on a game theory. The former one mainly uses uplink and downlink duality theory to convert a transmission beamforming problem into a receiving beamforming problem to solve, so as to reduce implementation difficulty and computation complexity; and the latter one considers from an angle of games between cells, achieves system performance gains through different game rules, and the latter one is specifically divided into a non-cooperative egoistic solution, a cooperation-based altruistic solution and an egoistic and altruistic compromise solution.

In addition to the two major coordinated beamforming solutions, another novel solution is a coordinated beamforming solution based on Interference Alignment (IA). A basic principle of interference alignment is to design transmission precoding matrixes at a base station end to enable all interference signals to be superposed in one receiving signal subspace with dimensions which are as small as possible after signals are transmitted to terminals through wireless channels, enable desired signals to be in one subspace which is linearly independent of the subspace of the interference signals, and then interference is subjected to zero forcing at the terminals by using interference suppression matrixes, improving system capacity.

Interference alignment technology is a research hotspot in recent years and can fully use Degree of Freedom of a system to coordinate interference between terminals under the situation of greater interference. Through a precoding technology, interference alignment enables interference to be overlapped together at receiving ends, such that the influence of interference on desired signals is thoroughly eliminated. Different from the existing interference processing methods such as interference ignoring, interference decoding/elimination and orthogonal access (interference avoidance), etc, IA maximizes desired signal dimensions, i.e., DOF by reducing signal dimensions occupied by interference, and then interference is eliminated and desired signals are extracted by adopting methods, such as ZF (Zero Forcing) detection, etc, at terminals.

At present, there are mainly two means to obtain precoding matrixes (vectors) in the IA technology, a direct method and an iterative method. The direct method can obtain a closed-form solution of precoding matrixes and is relatively simple, but ideal global Channel State Information (CSI) needs to be known; and the iterative method uses reciprocity of uplink and downlink channels and optimizes a target function through alternate iteration in receiving and transmitting ends to obtain precoding matrixes, and implementation complexity is higher. The most representative methods include a distributed IA iterative algorithm put forward by Gomada, Jafar, et al., and a Maximum Signal Interference Noise Ratio (Max-SINR), herein the purpose of distributed IA is to minimize energy leaked by interference in a desired subspace, and the purpose of Max-SINR is to maximize receiving SINR. In many current researches, optimization and improvement are made based on the two methods. For example, in the direct method, precoding vector selection is performed on a classic IA solution based on a chordal distance criterion or an optimal characteristic sub-channel; and in the iteration-based distributed IA solution, the target function is gradually converted from minimization of power leaked by interference in the desired subspace to minimization of weighted summation of power leaked by minimized interference in a desired space and power leaked by the desired signal in an interference space.

The traditional interference alignment method is to align all interferences to one subspace with dimensions which are as small as possible. However, with the increase of the number of terminals, constraint conditions of interference alignment will sharply increase to cause alignment to be difficult to implement. Most partial interference alignment methods in the related art give fixed alignment modes and rarely there is a method of considering pertinent selection from many alignment modes. In addition, when a terminal uses a limited number of bits to feed CSI information back to a base station, due to quantization of channels or precoding, a system inevitably has a remarkable performance loss. This problem is particularly outstanding for interference alignment. Under the situation of limited feedback, full alignment of interference cannot be realized.

Moreover, a partial interference alignment solution aiming at more than two paths of interference signals (classic interference alignment only aims at the situation of two paths of interference) is also a hotspot of current researches on IA technology. To select which interferences to perform alignment becomes an important content of researches on partial interference alignment. However, current related researches are still comparatively few.

SUMMARY

The embodiments of the present document provide a coordinated beamforming method and apparatus based on partial interference alignment, which improve the receiving intensity of desired signals on the premise of guaranteeing compression of interference subspaces, and thus achieve the purpose of effectively improving system sum rate.

In order to solve the above-mentioned technical problem, the embodiment of the present document provides a coordinated beamforming method based on partial interference alignment, including:

selecting an optimal partial interference alignment mode from selectable partial interference alignment modes of terminals covered by base stations in a coordinating cluster of a coordinated multiple points transmission according to a chordal distance criterion; and transmitting, by the base station, signals to the terminals by adopting the optimal partial interference alignment mode.

More preferably, selecting an optimal partial interference alignment mode from selectable partial interference alignment modes of terminals covered by base stations in a coordinating cluster of a coordinated multiple points transmission according to a chordal distance criterion includes:

respectively calculating precoding matrixes of each terminal in different partial interference alignment modes, wherein the precoding matrixes of the terminals in the same partial interference alignment mode form a precoding matrix group, one partial interference alignment mode corresponds to one precoding matrix group; and selecting a precoding matrix group corresponding to the optimal partial interference alignment mode from all precoding matrix groups according to the chordal distance criterion; and transmitting, by the base station, signals to the terminals by adopting the optimal partial interference alignment mode includes:

transmitting, by the base station, the signals to the terminals by adopting the precoding matrix group corresponding to the optimal partial interference alignment mode.

More preferably, selecting a precoding matrix group corresponding to the optimal partial interference alignment mode from all precoding matrix groups according to the chordal distance criterion includes:

selecting a precoding matrix group which makes a chordal distance between a desired signal subspace and an interference signal subspace maximum from all precoding matrix groups as the precoding matrix group corresponding to the optimal partial interference alignment mode.

More preferably, the partial interference alignment mode refers to aligning two base station interferences of three or more than three base station interferences of the terminals to one space.

More preferably, selecting the optimal partial interference alignment mode from selectable partial interference alignment modes of terminals covered by base stations in a coordinating cluster of a coordinated multiple points transmission according to a chordal distance criterion includes:

fixing partial interference alignment modes of partial terminals covered by the base stations in the coordinating cluster of a coordinated multiple points transmission, and calculating a precoding matrix of each terminal in each partial interference alignment mode in combination with unfixed partial interference alignment modes of other terminals covered by the base stations, wherein the precoding matrixes of the terminals in the same partial interference alignment mode form a precoding matrix group, one partial interference alignment mode corresponds to one precoding matrix group; and selecting a precoding matrix group corresponding to the optimal partial interference alignment mode from all precoding matrix groups according to the chordal distance criterion; and transmitting, by the base station, signals to the terminals by adopting the optimal partial interference alignment mode includes:

transmitting, by the base station, the signals to the terminals by adopting the precoding matrix group corresponding to the optimal partial interference alignment mode.

More preferably, after selecting the optimal partial interference alignment mode according to the chordal distance criterion, the method further includes:

performing bit allocation to the terminals according to the optimal partial interference alignment mode, and according to bits allocated to a corresponding terminal, determining a codebook set of a precoding matrix used by a base station to which the terminal belongs, quantizing the precoding matrix group corresponding to the optimal partial interference alignment mode according to the codebook set, and transmitting the signals to the terminals by adopting the quantized precoding matrix group.

More preferably, performing bit allocation to the terminals according to the optimal partial interference alignment mode includes:

in the optimal partial interference mode, if there are a plurality of terminals which align the same two base station interferences to one space, allocating a greater number of bits to the terminals covered by the same two base stations than a number of bits allocated to the terminals covered by other base stations, and if there are not a plurality of terminals which align the same two base station interferences to one space, respectively allocating an equal number of bits to the terminals.

More preferably, there are K base stations in the transmission coordinating cluster of the coordinated multiple points, herein each base station serves one terminal, each base station and each terminal respectively include M antennas, and the K base stations respectively and independently transmit $d_k$ data streams to the terminals, herein k=1, 2, . . . K, a number of the antennas is at least $M=(K-2)d_k+d_k$, K is an integer greater than 3, $d_k$ is an integer greater than or equal to 1 and less than or equal to M/(K−1), and "/" denotes division operation.

In order to solve the above-mentioned technical problem, the embodiment of the present document further provides a coordinated beamforming apparatus based on partial interference alignment, including:

a selection module configured to select an optimal partial interference alignment mode from selectable partial interference alignment modes of terminals covered by base stations in a coordinating cluster of a coordinated multiple points transmission according to a chordal distance criterion; and a transmission module configured to transmit signals to the terminals by adopting the optimal partial interference alignment mode.

More preferably, the selection module is configured to select the optimal partial interference alignment mode from the selectable partial interference alignment modes of the terminals covered by the base stations in the coordinating cluster of the coordinated multiple points transmission according to the chordal distance criterion through the following way:

respectively calculating precoding matrixes of each terminal in different partial interference alignment modes, wherein the precoding matrixes of the terminals in the same partial interference alignment mode form a precoding matrix group, one partial interference alignment mode corresponds to one precoding matrix group; and selecting a precoding matrix group corresponding to the optimal partial interference alignment mode from all precoding matrix groups according to the chordal distance criterion; and the transmission module is configured to transmit the signals to the terminals by adopting the optimal partial interference alignment mode through the following way:

transmitting the signals to the terminals by adopting the precoding matrix group corresponding to the optimal partial interference alignment mode.

More preferably, the selection module is configured to select the precoding matrix group corresponding to the optimal partial interference alignment mode from all precoding matrix groups according to the chordal distance criterion through the following way:

selecting a precoding matrix group which makes a chordal distance between a desired signal subspace and an interference signal subspace maximum from all precoding matrix groups as the precoding matrix group corresponding to the optimal partial interference alignment mode.

More preferably, the partial interference alignment mode refers to aligning two base station interferences of three or more than three base station interferences of the terminals to one space.

More preferably, the selection module is configured to select the optimal partial interference alignment mode from the selectable partial interference alignment modes of the terminals covered by the base stations in the coordinating cluster of the coordinated multiple points transmission according to the chordal distance criterion through the following way:

fixing partial interference alignment modes of partial terminals covered by the base stations in the coordinating cluster of the coordinated multiple points transmission, and calculating a precoding matrix of each terminal in each partial interference alignment mode in combination with unfixed partial interference alignment modes of other terminals covered by the base stations, wherein the precoding matrixes of the terminals in the same partial interference alignment mode form a precoding matrix group, one partial interference alignment mode corresponds to one precoding matrix group; and selecting a precoding matrix group corresponding to the optimal partial interference alignment mode from all precoding matrix groups according to the chordal distance criterion; and the transmission module is configured to transmit the signals to the terminals by adopting the optimal partial interference alignment mode through the following way:

transmitting the signals to the terminals by adopting the precoding matrix group corresponding to the optimal partial interference alignment mode.

More preferably, the apparatus further includes:

a bit allocation module configured to perform bit allocation to the terminals according to the optimal partial interference alignment mode, and according to bits allocated to a corresponding terminal, determine a codebook set of a precoding matrix used by a base station to which the terminal belongs, quantize the precoding matrix group corresponding to the optimal partial interference alignment mode according to the codebook set, and transmit the signals to the terminals by adopting the quantized precoding matrix group; and the transmission module is further configured to transmit the signals to the terminals by adopting the quantized precoding matrix group.

More preferably, the bit allocation module is configured to perform bit allocation to the terminals according to the optimal partial interference alignment mode through the following way:

in the optimal partial interference mode, if there are a plurality of terminals which align the same two base station interferences to one space, allocating a greater number of bits to the terminals covered by the same two base stations than a number of bits allocated to the terminals covered by other base stations, and if there are not a plurality of terminals which align the same two base station interferences to one space, respectively allocating an equal number of bits to the terminals.

The embodiment of the present document further provides a computer program including program instructions, which, when executed by a base station, enable the base station to implement the above-mentioned method.

The embodiment of the present document further provides a carrier carrying the above-mentioned computer program.

According to the coordinated beamforming method and apparatus based on partial interference alignment provided by the embodiment of the present document, in one aspect, firstly a plurality of base stations in a coordinating cluster of a coordinated multiple points transmission select a precoding matrix group corresponding to an optimal alignment mode from different partial interference alignment modes according to a chordal distance criterion to transmit signals, the receiving intensity of desired signals is improved on the premise of guaranteeing compression of an interference subspace, and thus the purpose of effectively improving system sum rate is achieved; and in another aspect, limited feedback design based on a partial interference alignment solution is effectively performed, and bit allocation to terminals is adaptively performed according to the selected alignment mode to minimize performance loss caused by quantization.

PREFERRED EMBODIMENTS

The embodiments of the present document will be described below in detail in combination with the drawings. It needs to be stated that the embodiments in the present application and the features in the embodiments can be freely combined under the situation of no conflict.

EMBODIMENTS

Figure 1:
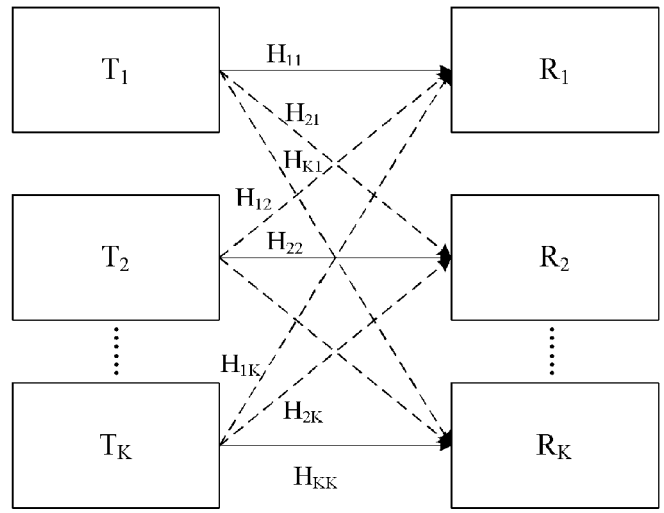
FIG. 1 is a schematic diagram of an MIMO interference channel model.

This embodiment mainly aims at beamforming of cell edge users (terminals), and considering one interference channel system, as shown in FIG. 1, a Multiple-Input Multiple-Output (MIMO) interference channel model is provided. In the FIG. 1, full lines denote useful channels; dashed lines denote interference channels; T denotes a transmitting end (base station); R denotes a receiving end (terminal); there are K base stations $T_k$ and K terminals $R_k$ in a coordinating cluster of a Coordinated Multiple Points (CoMP), K is an integer greater than 3, each base station serves one terminal, the base stations respectively and independently transmit $d_k$=d (k=1, 2, ..., K) data streams to corresponding target terminals, and $d_k$ is an integer greater than or equal to 1 and less than or equal to M/(K−1), and "/" denotes division operation. Each base station and each terminal in cells are respectively provided with M antennas. Inter-user interferences are not considered, only inter-cell interferences are considered, each terminal receives interferences from K−1 other base stations, and the partial interference alignment mode refers to aligning two base station interferences of a plurality of base station interferences of the terminals to one space, such that total interference space dimensions are reduced from original (K−1)d to (K−2)d. Since the receiving space dimension is M and a desired signal space occupies d dimensions, therefore, in order to receive desired signals and interference signals, the number of antennas should be at least M=(K−2)d+d.

Figure 2:
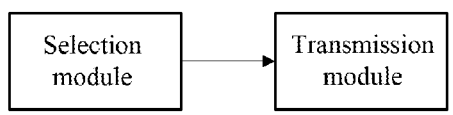
FIG. 2 is a structural diagram of a coordinated beamforming apparatus based on partial interference alignment in the embodiment.

As shown in FIG. 2, this embodiment provides a coordinated beamforming apparatus based on partial interference alignment, and the apparatus includes:

a selection module configured to select an optimal partial interference alignment mode from various partial alignment modes (which may also be called as selectable partial interference alignment modes since some modes are invalid) of terminals covered by base stations in a coordinating cluster of a coordinated multiple points transmission according to a chordal distance criterion;

herein the number of the base stations is at least four, such that each terminal receives interferences from other three base stations and partial interference alignment may be adopted; and a transmission module configured to transmit signals to the terminals by adopting the optimal partial interference alignment mode.

The apparatus may be applied to transmitting ends (base stations) and may also be applied to receiving ends (terminals). If the apparatus is applied to the receiving ends, the transmission module is configured to feed the optimal partial interference alignment mode back to the transmitting ends (base stations) such that the base stations transmit signals to the terminals by adopting the optimal partial alignment interference alignment mode.

Herein, the selection module is configured to select the optimal partial interference alignment mode from the selectable partial interference alignment modes of the terminals covered by the base stations in the coordinating cluster of the coordinated multiple points transmission according to the chordal distance criterion through the following way:

precoding matrixes of each terminal in different partial interference alignment modes are calculated respectively, the precoding matrixes of the terminals in the same partial interference alignment mode form a precoding matrix group, and each partial interference alignment mode corresponds to one precoding matrix group; and a precoding matrix group corresponding to the optimal partial interference alignment mode is selected from all precoding matrix groups according to the chordal distance criterion; and the transmission module is configured to transmit the signals to the terminals by adopting the optimal partial interference alignment mode through the following way:

the signals are transmitted to the terminals by adopting the precoding matrix group corresponding to the optimal partial interference alignment mode.

Herein, the selection module is configured to select the precoding matrix group corresponding to the optimal partial interference alignment mode from all precoding matrix groups according to the chordal distance criterion through the following way:

a precoding matrix group which makes a chordal distance between a desired signal subspace and an interference signal subspace maximum is selected from all precoding matrix groups to be used as the precoding matrix group corresponding to the optimal partial interference alignment mode.

Herein, the partial interference alignment mode refers to aligning two base station interferences of three or more than three base station interferences of the terminals to one space.

As a preferred embodiment, the selection module is configured to select the optimal partial interference alignment mode from the selectable partial interference alignment modes of the terminals covered by the base stations in the coordinating cluster of the coordinated multiple points transmission according to the chordal distance criterion through the following way:

it is to fix partial interference alignment modes of part of terminals covered by the base stations in the coordinating cluster of the coordinated multiple points transmission, and a precoding matrix of each terminal in each partial interference alignment mode is calculated in combination with unfixed partial interference alignment modes of other terminals covered by the base stations, the precoding matrixes of the terminals in the same partial interference alignment mode form a precoding matrix group, and each partial interference alignment mode corresponds to one precoding matrix group; and a precoding matrix group corresponding to the optimal partial interference alignment mode is selected from all precoding matrix groups according to the chordal distance criterion; and the transmission module is configured to transmit the signals to the terminals by adopting the precoding matrix group corresponding to the optimal partial interference alignment mode.

As a preferred embodiment, the apparatus further includes:

a bit allocation module configured to perform bit allocation to the terminals according to the optimal partial interference alignment mode, and according to bits allocated to a corresponding terminal, determine a codebook set of a precoding matrix used by the base station to which the terminal belongs, quantize the precoding matrix group corresponding to the optimal partial interference alignment mode according to the codebook set, and transmit the signals to the terminals by adopting the quantized precoding matrix group; and the transmission module is further configured to transmit the signals to the terminals by adopting the quantized precoding matrix group.

If the apparatus is applied to the transmitting end, the transmission module is further configured to feed the quantized precoding matrix group back to the base station such that the base station transmits the signals to the terminal by adopting the quantized precoding matrix group.

Herein, the bit allocation module is configured to perform bit allocation to the terminals according to the optimal partial interference alignment mode through the following way:

in the optimal partial interference mode, if there are a plurality of terminals which align the same two base station interferences to one space, a greater number of bits is allocated to the terminals covered by the same two base stations than a number of bits allocated to the terminals covered by other base stations, and if there are not the plurality of terminals which align the same two base station interferences to one space, an equal number of bits is respectively allocated to each terminal.

Figure 3:
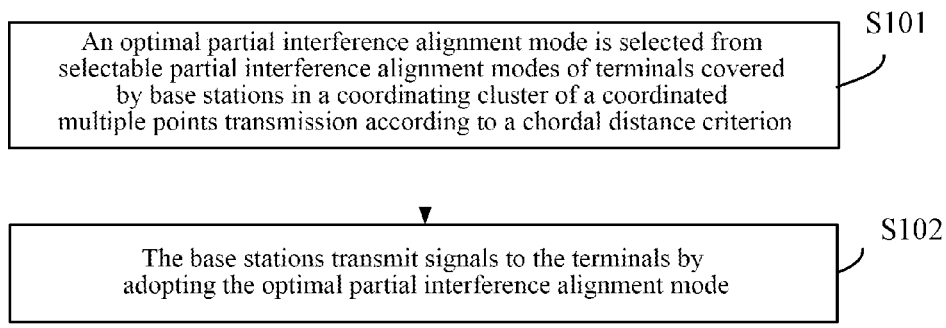
FIG. 3 is a flowchart of a coordinated beamforming method based on partial interference alignment in the embodiment.

As shown in FIG. 3, the embodiment provides a coordinated beamforming method based on partial interference alignment, including the following steps:

In S101, an optimal partial interference alignment mode is selected from selectable partial interference alignment modes of terminals covered by base stations in a coordinating cluster of a coordinated multiple points transmission according to a chordal distance criterion;

herein, interferences of the terminals are interferences from a plurality of other base stations and the partial interference alignment modes of the terminals are not fixed. Therefore, each terminal has a plurality of alignment modes. The partial interference alignment mode refers to aligning two base station interferences of a plurality of base station interferences of the terminals to one space. Each base station serves one terminal.

In S102, the base stations transmit signals to the terminal by adopting the optimal partial interference alignment mode.

Herein, step S101 includes:

corresponding precoding matrixes of each terminal in different partial interference alignment modes are calculated respectively, the precoding matrixes in each partial interference alignment mode form a precoding matrix group; and a precoding matrix group corresponding to the optimal partial interference alignment mode is selected from a precoding matrix group set according to the chordal distance criterion.

Herein, a precoding matrix group which makes a chordal distance between a desired signal subspace and an interference signal subspace maximum is selected from the precoding matrix group set to be used as a precoding matrix group corresponding to the optimal partial interference alignment mode.

In step S102, the plurality of base stations transmit signals to the terminals by adopting the precoding matrix group corresponding to the optimal partial interference alignment mode.

Figure 4:
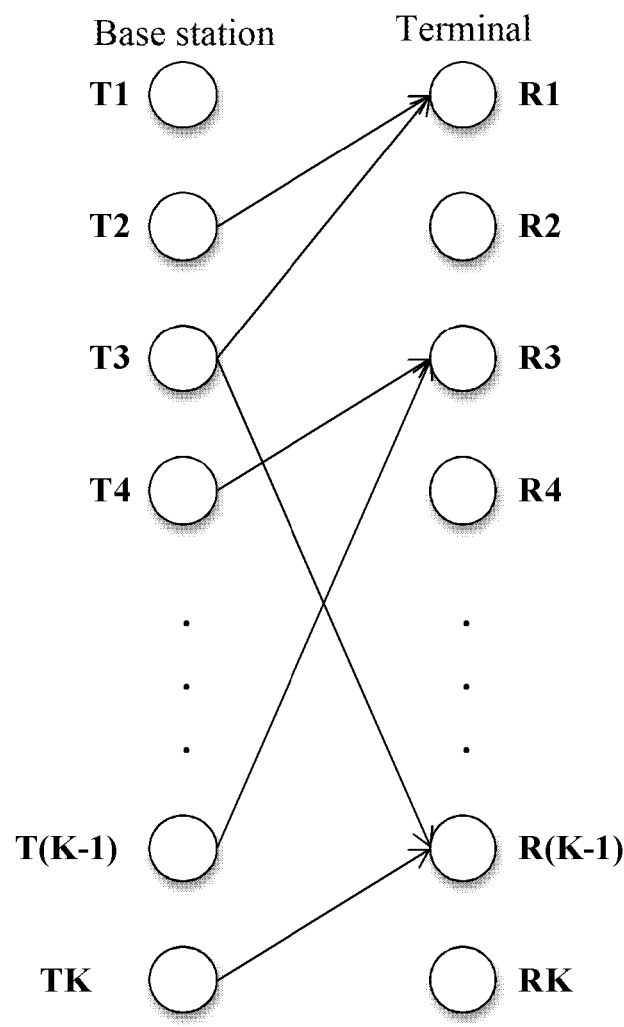
FIG. 4 is a schematic diagram of fixing partial interference alignment modes of partial terminals and calculating an optimal partial interference alignment mode in the embodiment.
Figure 5:
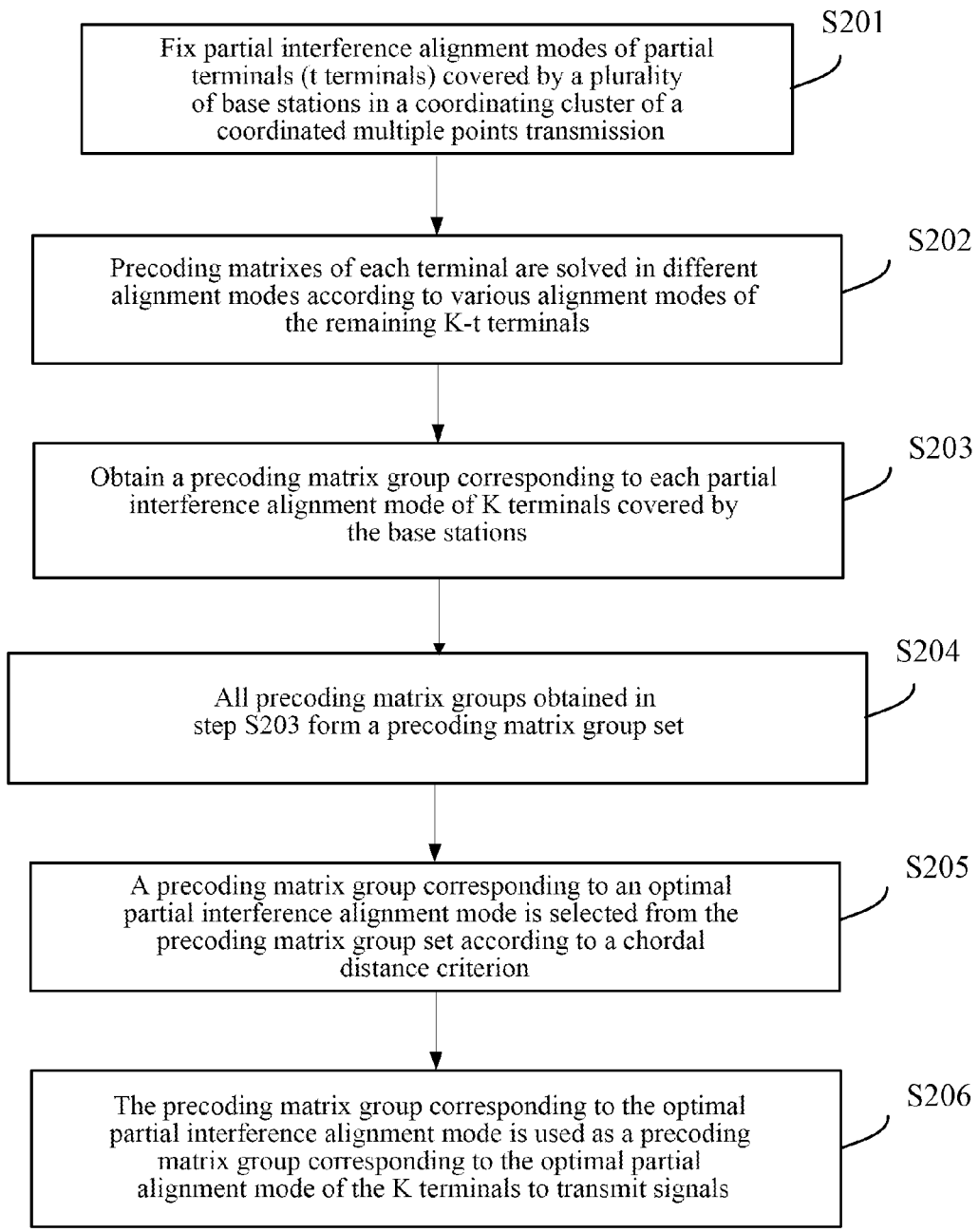
FIG. 5 is a flowchart of a coordinated beamforming method based on partial interference alignment in the embodiment.

As a preferred embodiment, partial interference alignment modes of partial terminals covered by a plurality of base stations may be fixed firstly. For example, as shown in FIG. 4, totally there are K terminals, the partial interference alignment modes of three terminals are fixed, e.g., the alignment modes of R1, R3 and R(K−1) are fixed, and then aiming at unfixed partial interference alignment modes of the remaining K−3 terminals, a precoding matrix group set corresponding to the unfixed partial interference alignment modes is calculated, and then the signals are transmitted by a precoding matrix group corresponding to the optimal partial interference alignment mode selected according to the chordal distance criterion. In this embodiment, the purpose is to select the optimal alignment mode of the remaining K−3 terminals. As shown in FIG. 5, a flow of a coordinated beamforming method based on partial interference alignment includes the following steps:

In S201, it is to fix partial interference alignment modes of partial terminals (t terminals) covered by base stations in a coordinating cluster of a coordinated multiple points transmission;

In S202, precoding matrixes of each terminal in different alignment modes are solved according to various alignment modes (possibly including invalid modes) of the remaining K−t terminals;

In S203, a precoding matrix group corresponding to each partial interference alignment mode of K terminals covered by the base stations is obtained;

In S204, all precoding matrix groups obtained in step S203 form a precoding matrix group set;

A precoding matrix group is formed corresponding to each alignment mode, and a precoding matrix group set is formed corresponding to all alignment modes.

In S205, a precoding matrix group corresponding to an optimal partial interference alignment mode is selected from the precoding matrix group set according to a chordal distance criterion;

In S206, the precoding matrix group corresponding to the optimal partial interference alignment mode is used as a precoding matrix group corresponding to the optimal partial alignment mode of the K terminals to transmit signals.

Under the ideal CSI condition, i.e., when transmitting ends know ideal global channel state information CSI, the above-mentioned steps may be executed by the transmitting ends and a precoding matrix group corresponding to the optimal partial interference alignment mode is selected to transmit signals, or the above-mentioned steps are executed by receiving ends and then a precoding matrix group corresponding to the optimal partial interference alignment mode is fed back to the transmitting ends to transmit signals.

When a terminal uses a limited number of bits to feed CSI information back to a base station, due to quantization of channels or precoding, a system inevitably has a remarkable performance loss. In order to minimize performance loss caused by quantization, after determining the optimal partial interference alignment mode, the method may further includes:

bit allocation to the terminals is performed according to the optimal partial interference alignment mode, a codebook set of a precoding matrix used by the base station to which the terminal belongs is determined according to bits allocated to the corresponding terminal, the precoding matrix group corresponding to the optimal partial interference alignment mode is quantized according to the codebook set, and the signals are transmitted to the terminals by adopting the quantized precoding matrix group.

The codebook set $W_k$ has already been known by the base station and the terminal. In one application example, the codebook adopted in the embodiment is a randomly-generated independent codebook $W_k \times \{\hat{v}_1, \ldots, \hat{v}_{2^{B_k}}\}$, herein $\hat{v}_1, \ldots, \hat{v}_{2^{B_k}}$ are elements of the codebook set. If $B_k$ feedback bits are allocated to a terminal k, the codebook set therein has $2^{B_k}$ elements. The terminal k compares a real precoding $V_k$ with each element in $W_k$, selects an element closest to $V_k$ to replace $V_k$ and feeds a serial number of the selected element (i.e., a Precoding Matrix Indicator, PMI, 1, or 2, or ... or $2^{B_k}$) back to inform the base station, and only the serial number needs to be fed back, thus the base station can know that which codebook element is selected by the terminal according to the received serial number (the codebook has already been known by both two ends). This process is called as quantization. Quantization greatly reduces the amount of feedback brought by the ideal CSI, and this is called as limited feedback.

As a preferred embodiment, performing bit allocation to the terminals according to the optimal partial interference alignment mode includes:

in the optimal partial interference mode, if there are a plurality of terminals which align the same two base station interferences to one space, a greater number of bits is allocated to the terminals covered by the same two base stations than a number of bits allocated to the terminals covered by other base stations, and if there are not a plurality of terminals which align the same two base station interferences to one space, an equal number of bits is respectively allocated to the terminals.

The embodiment of the present document further provides a computer program including a program instruction, herein when the program instruction is executed by a base station, the base station is enabled to implement the above-mentioned method.

The embodiment of the present document further provides a carrier carrying the above-mentioned computer program.

Application Example 1

Figure 6:
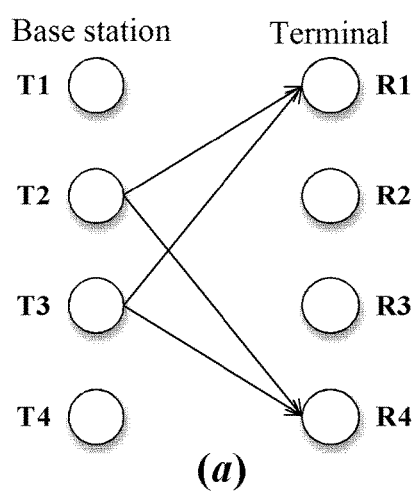
FIG. 6 is a schematic diagram of a 4-cell 4-terminal scenario in an application example.
Figure 6:
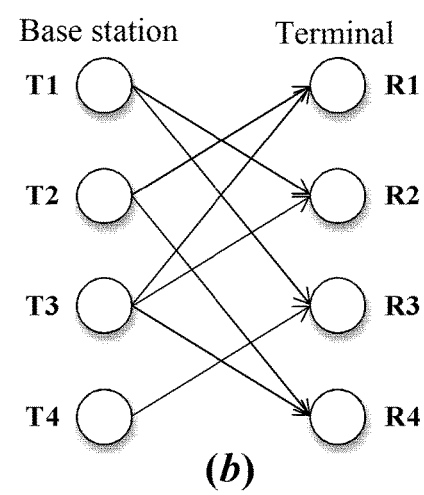
Figure 7:
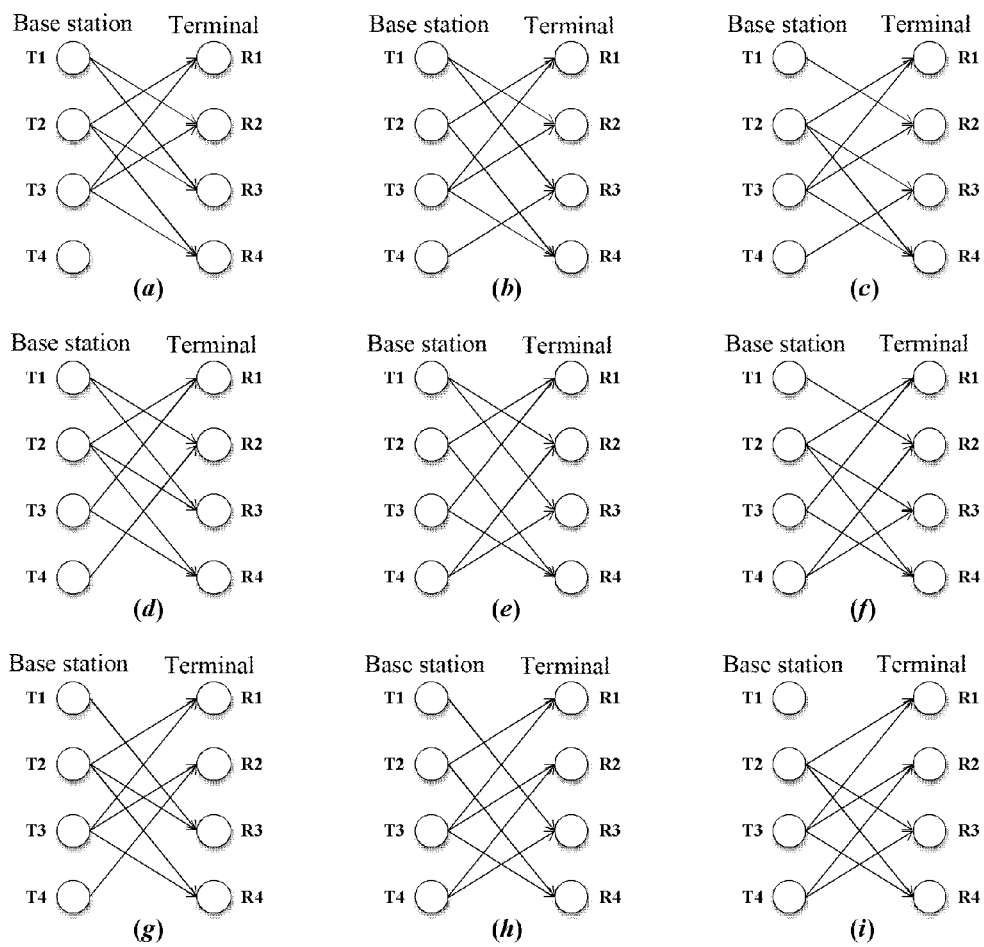
FIG. 7 is a schematic diagram of all alignment modes after fixing interference alignment modes of <terminal R1, terminal R4>.

A 4-cell 4-terminal scenario as shown in FIG. 6 is adopted. It is supposed that the numbers of antennas configured at each base station and at each terminal are the same, and each base station transmits d data streams to the corresponding terminal. If the alignment modes of the four terminals are not fixed, totally there are 69 valid alignment modes, herein FIG. 6(a) illustrates all alignment modes after fixing interference alignment modes of <terminal R1, terminal R4>. Since alignment modes of R2 and R3 are not fixed, R2 includes three alignment modes in which T1T3, T1T4 and T3T4 are respectively aligned to one space. Similarly, R3 has three alignment modes. Through combination, the two terminals totally have nine alignment modes. As shown in FIG. 7, seven alignment modes thereof are valid. FIG. 6(b) is a situation that alignment modes of 4 terminals are fixed and illustrates one of seven valid alignment modes.

An interference channel system as shown in FIG. 1 is considered, herein K=4, and in this application example, it is supposed that each cell (base station) serves one terminal for calculating conveniently. Four base stations respectively and independently transmit $d_k=1$ (k=1, 2, 3, 4) data streams to corresponding target terminals. Each base station and each terminal in cells are provided with M=3 antennas. $H_{kj}$ denotes a channel matrix (3×3 dimensions) from a base station in a cell j to a terminal in a cell k and it is supposed that all elements of $H_{kj}$ are mutually independent and comply with complex Gaussian random distribution with zero-mean and unit variance. Transmitting power of each base station is $P_k=P$, receiving noise of each terminal is $n_k$ and noise power is $\sigma^2=1$. Receiving signal $y_k$ of the kth terminal may be expressed as:

$$y_k = H_{kk} V_k x_k + \sum_{j=1, j \neq k}^{K} H_{kj} V_j x_j + n_k \qquad (1)$$

herein $x_j$ is a signal vector transmitted by the base station in cell j, $V_j$ (3×1 dimensions) is a transmission precoding vector of the base station in cell j and its norm is 1.

Figure 8:
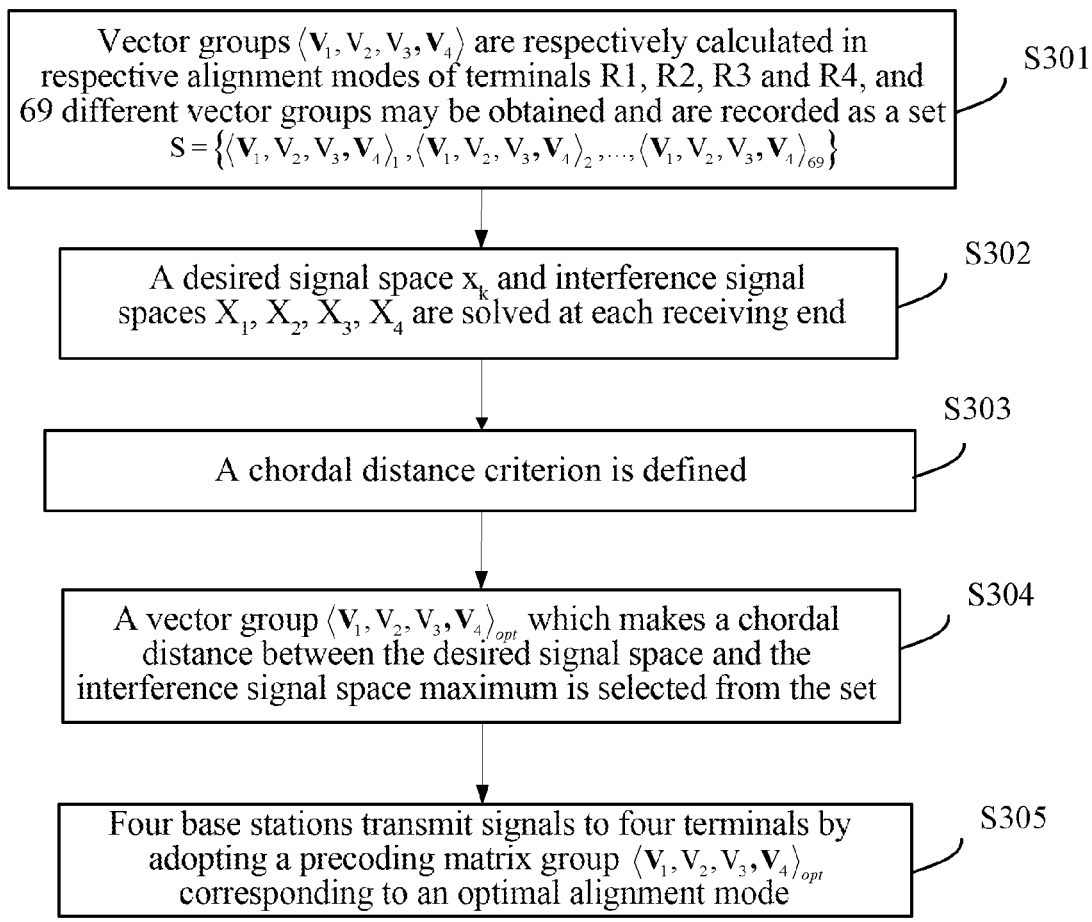
FIG. 8 is a flowchart of a coordinated beamforming method based on partial interference alignment in application example 1.

A flow of a coordinated beamforming method based on partial interference alignment provided by this embodiment will be described below in detail in combination with FIG. 8:

In S301, vector groups $\langle V_1, V_2, V_3, V_4 \rangle$ of terminals $R_1$, $R_2$, $R_3$ and $R_4$ are respectively calculated in respective alignment modes, herein totally there are 81 alignment modes (herein no matrix is solved for several alignment modes and thus there are 69 valid alignment modes), 69 different vector groups may be obtained and are recorded as a set $S=\{\langle V_1, V_2, V_3, V_4 \rangle, \langle V_1, V_2, V_3, V_4 \rangle_2, \ldots, \langle V_1, V_2, V_3, V_4 \rangle_{69}\}$, and each vector group corresponds to one alignment mode.

By taking one of 69 valid alignment modes as an example, as shown in FIG. 6(b), a group $\langle V_1, V_2, V_3, V_4 \rangle$ is solved. According to the alignment modes as shown in the figure, there should be:

span($H_{12}V_2$)=span($H_{13}V_3$) at user 1 span($H_{21}V_1$)=span($H_{23}V_3$) at user 2 span($H_{31}V_1$)=span($H_{34}V_4$) at user 3 span($H_{42}V_2$)=span($H_{43}V_3$) at user 4 \qquad (2)

the results are obtained by solving:

$V_3=d$ eigenvectors of $((H_{43})^{-1}H_{42}(H_{12})^{-1}H_{13})$ $V_2=(H_{12})^{-1}H_{13}V_3$ $V_1=(H_{21})^{-1}H_{23}V_3$ $V_4=(H_{34})^{-1}H_{31}V_1$ \qquad (3)

herein span(X) denotes a vector space spanned by each column of matrix X, e.g., at user 1, interferences of $R_2$ and $R_3$ are respectively aligned to one space; $V_3$ denotes d characteristic vectors randomly selected from matrix $((H_{43})^{-1}H_{42}(H_{12})^{-1}H_{13})$ and d is the number of data streams.

Ways for solving other 68 valid alignment modes are similar and thus are not repetitively described.

In S302, a desired signal space and interference signal spaces are solved at each receiving end;

$x_k=[H_{kk}V_k](k=1,2,3,4)$ \qquad (4)

$X_1=[H_{12}V_2,H_{13}V_3,H_{14}V_4]$ $$X_2=[H_{21}V_1,H_{23}V_3,H_{24}V_4]$$

$$X_3=[H_{31}V_1,H_{32}V_2,H_{34}V_4]$$

$$X_4=[H_{41}V_1,H_{42}V_2,H_{43}V_3] \qquad (5)$$

In S303, a chordal distance criterion is defined, and for $m \times n_1$-dimension matrix $X_1$ and $m \times n_2$-dimension matrix $X_2$ ($m \geq n_1, n_2$), a chordal distance expression is:

$$d(X_1, X_2) = \frac{1}{\sqrt{2}} \|O(X_1)O(X_1)^H - O(X_2)O(X_2)^H\|_F \qquad (6)$$

$$= \sqrt{\frac{n_1+n_2}{2} - \|O(X_1)^H O(X_2)\|_F}$$

herein O(X) denotes a matrix consisting of orthogonal basis vectors of column spaces of matrix X.

In S304, a vector group which makes a chordal distance between the desired signal space and the interference signal space maximum is selected from the set S;

$$\langle V_1, V_2, V_3, V_4 \rangle_{opt} = \qquad (7)$$

$$\underset{\langle V_1, V_4 \rangle \in S}{\operatorname{argmax}} \{d(x_1, X_1) + d(x_2, X_2) + d(x_3, X_3) + d(x_4 X_4)\}$$

formula (7) is solved here by adopting an exhaustive search way.

In S305, four base stations transmit signals to four terminals by adopting a precoding matrix group $\langle V_1, V_2, V_3, V_4 \rangle_{opt}$ corresponding to an optimal alignment mode.

Figure 9:
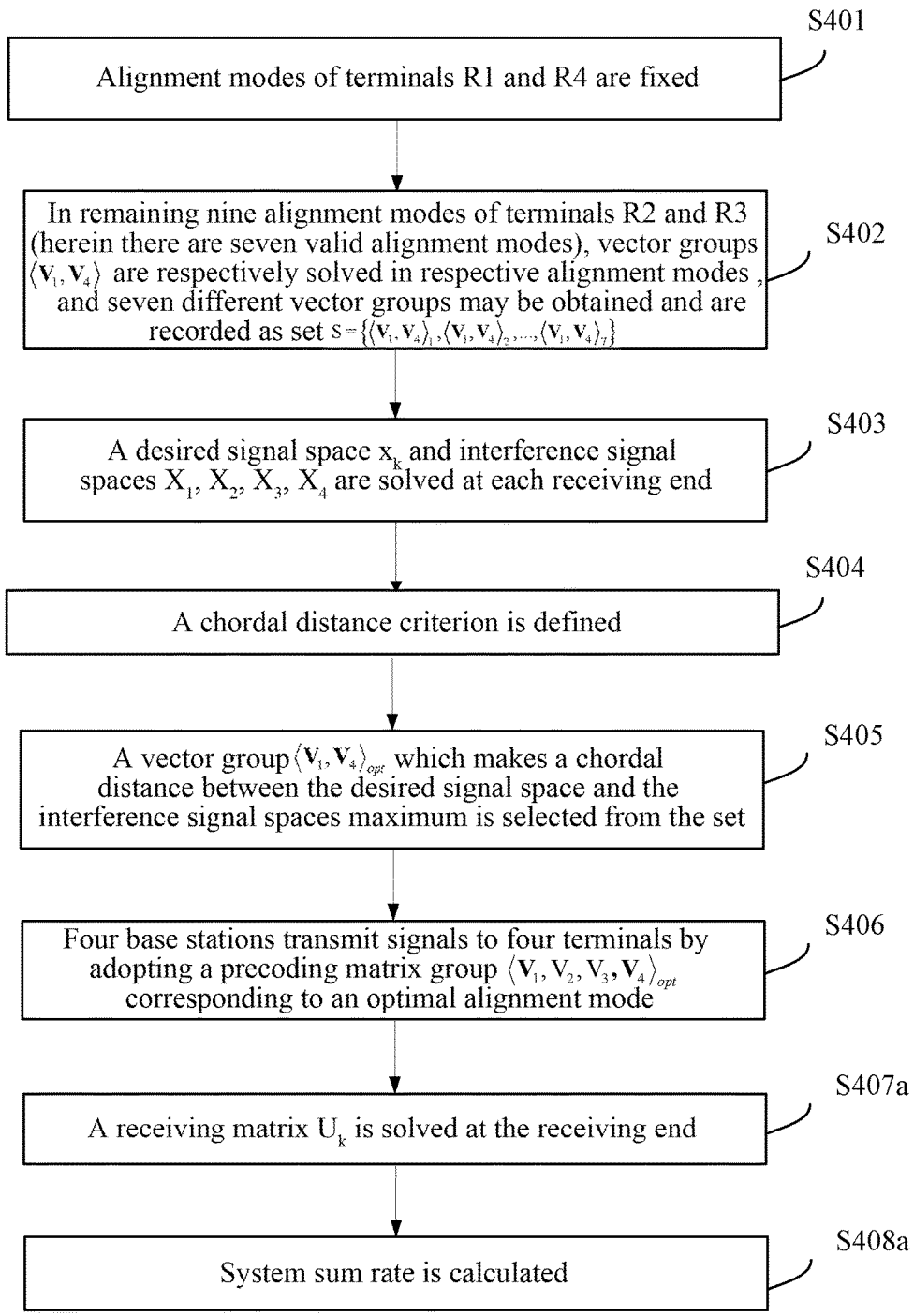
FIG. 9 is a flowchart of a coordinated beamforming method based on partial interference alignment in application example 1.

In this application example, as a preferred embodiment, alignment modes of partial terminals may be firstly fixed, as shown in FIG. 6(a). A flow of a coordinated beamforming method based on partial interference alignment provided by this embodiment will be further described below in combination with FIG. 9:

In S401, alignment modes of terminals $R_1$ and $R_4$ are fixed:

$$\operatorname{span}(H_{12}V_2)=\operatorname{span}(H_{13}V_3) \text{ at user 1}$$

$$\operatorname{span}(H_{42}V_2)=\operatorname{span}(H_{43}V_3) \text{ at user 4} \qquad (8)$$

the results are obtained by solving:

$$V_3 = d \text{ eigenvectors of } ((H_{43})^{-1}H_{42}(H_{12})^{-12})^{-1}H_{13})$$

$$V_2=(H_{12})^{-1}H_{13}V_3 \qquad (9)$$

herein span(X) denotes a vector space spanned by each column of matrix X, i.e., interferences of $R_1$ and $R_4$ are respectively aligned to one space; $V_3$ denotes d characteristic vectors randomly selected from matrix $((H_{43})^{-1}H_{42}(H_{12})^{-1}H_{13})$ and d is the number of data streams.

In S402, in remaining nine alignment modes of terminals $R_2$ and $R_3$ (herein two alignment modes cannot be solved to obtain matrixes and thus there are seven valid alignment modes) vector groups $\langle V_1, V_4 \rangle$ are respectively solved in respective alignment modes, seven different vector groups may be obtained and are recorded as set $S=\{<V_1, V_4>_1, <V_1, V_4>_2, \ldots, <V_1, V_4>_7\}$ and each vector group corresponds to one alignment mode;

Since V2 and V3 have already been fixed, V2 and V3 are not solved here and only V1 and V4 need to be solved. A way for solving V1 and V4 is the same as the way in step S301. By taking one of seven valid alignment modes as an example, as shown in FIG. 6(b), a group $<V_1, V_4>$ is solved. According to alignment modes as shown in the figure, there should be:

$$\operatorname{span}(H_{21}V_1)=\operatorname{span}(H_{23}V_3) \text{ at user2}$$

$$\operatorname{span}(H_{31}V_1)=\operatorname{span}(H_{34}V_4) \text{ at user3} \qquad (10)$$

According to the first formula, the result may be obtained:

$$V_1=(H_{21})^{-1}H_{23}V_3 \qquad (11)$$

According to the second formula, the result may be obtained:

$$V_4=(H_{34})^{-1}H_{31}V_1 \qquad (12)$$

Ways for solving other six valid alignment modes are similar and thus are not repetitively described.

In S403, a desired signal space and interference signal spaces are solved at each receiving end;

$$x_k=[H_{kk}V_k] (k=1,2,3,4) \qquad (13)$$

$$X_1=[H_{12}V_2,H_{13}V_3,H_{14}V_4]$$

$$X_2=[H_{21}V_1,H_{23}V_2,H_{24}V_4]$$

$$X_3=[H_{31}V_1,H_{32}V_2,H_{34}V_4]$$

$$X_4=[H_{42}V_1,H_{42}V_2,H_{43}V_3] \qquad (14)$$

In S404, a chordal distance criterion is defined, for $m \times n_1$-dimension matrix $X_1$ and $m \times n_2$-dimension matrix $X_2$ ($m \geq n_1, n_2$), a chordal distance expression is:

$$d(X_1, X_2) = \frac{1}{\sqrt{2}} \|O(X_1)O(X_1)^H - O(X_2)O(X_2)^H\|_F \qquad (15)$$

$$= \sqrt{\frac{n_1+n_2}{2} - \|O(X_1)^H O(X_2)\|_F}$$

herein O(X) denotes a matrix consisting of orthogonal basis vectors of column spaces of matrix X.

In S405, a vector group which makes a chordal distance between the desired signal space and the interference signal space maximum is selected from the set S;

$$\langle V_1, V_4 \rangle_{opt} = \underset{\langle V_1, V_4 \rangle \in S}{\operatorname{argmax}} \{d(x_1, X_1) + d(x_2, X_2) + d(x_3, X_3) + d(x_4, X_4)\} \qquad (16)$$

formula (16) is solved here by adopting an exhaustive search way.

In S406, four base stations transmit signals to four terminals by adopting a precoding matrix group $\langle V_1, V_2, V_3, V_4 \rangle_{opt}$ corresponding to an optimal alignment mode, herein V2 and V3 are fixed and V1 and V4 are optimal.

In addition, in order to prove that the effect is remarkable after this embodiment is adopted, in this application example, the method further includes steps for calculating a system sum rate under an ideal CSI condition, including:

In S407a, a receiving matrix $U_k$ is solved at the receiving end; firstly let $$H_1=[H_{12}V_2,H_{13}V_3,H_{14}V_4],$$

$$H_2=[H_{21}V_1,H_{23}V_3,H_{24}V_4],$$

$$H_3=[H_{31}V_1,H_{32}V_2,H_{34}V_4]$$

$$H_4=[H_{41}V_1,H_{42}V_2,H_{43}V_3]. \qquad (17)$$

and then SVD (Singular Value Decomposition) is performed on a matrix $H_k$ to obtain $$H_k = [\overline{U}_k \quad \tilde{U}_k] \begin{bmatrix} \Sigma_k & \\ & 0 \end{bmatrix} \begin{bmatrix} \overline{V}_k^H \\ \tilde{V}_k^H \end{bmatrix},$$

herein $\Sigma_k$ denotes a diagonal matrix consisting of non-zero singular values, $\overline{U}_k$ and $\overline{V}^k$ respectively denote matrixes consisting of left and right singular values corresponding to non-zero singular values, and $\tilde{U}_k$ and $\tilde{V}_k$ respectively denote matrixes consisting of left and right singular vectors corresponding to zero singular values;
and a zero-forcing receiving matrix is taken as:

$$U_k = \tilde{U}_k \quad (18)$$

In S408a, the system sum rate is calculated, i.e., a sum of rates of four terminals is solved.

$$R_{sum} = \sum_{k=1}^{4} R_k = \sum_{k=1}^{4} \log \left| I_{d_k} + Q_{kk} \left( \sigma^2 I_{d_k} + \sum_{j=1,j\neq k}^{4} Q_{kj} \right)^{-1} \right| \quad (19)$$

herein $$Q_{kj} = \frac{P_j}{d_j} U_k^H H_{kj} V_j V_j^H H_{kj}^H U_k$$

and $I_{d_k}$ denotes a unit matrix with $d_k \times d_k$ dimensions.

Figure 10:
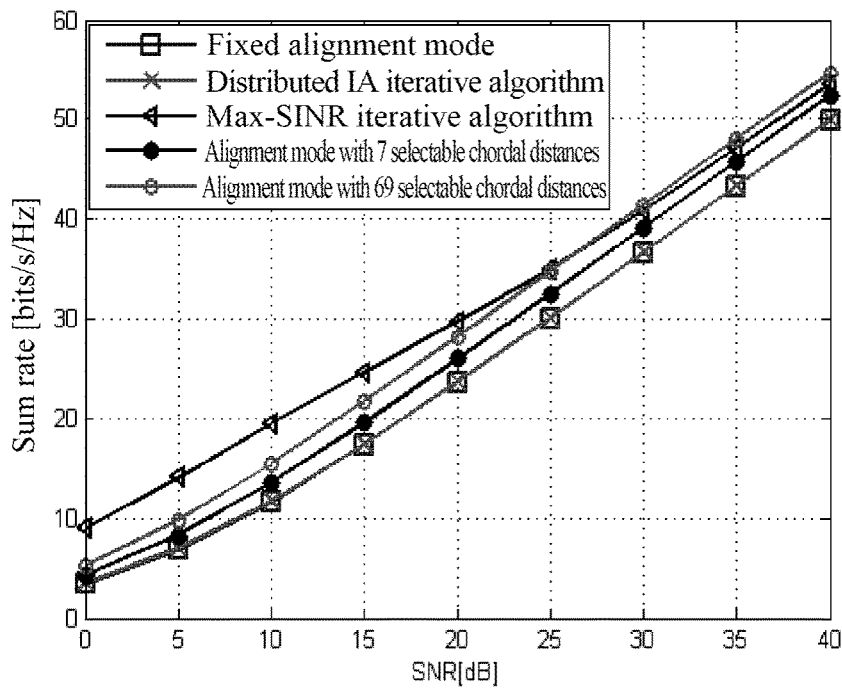
FIG. 10 is a schematic diagram of sum rate comparison of terminal alignment modes selected based on a chordal distance criterion in application example 1 with other solutions.

Respectively 2000 times of independent simulation are performed by adopting the solution of unfixed alignment mode (the alignment mode with 69 selectable chordal distances) and fixed alignment mode of partial terminals (the alignment mode with 7 selectable chordal distances) in this embodiment, the distributed IA iterative algorithm, the Max-SINR iterative algorithm and a fixed alignment solution under the same channel condition, herein 50 times of iteration are performed on the distributed IA iterative algorithm and the Max-SINR iterative algorithm at each time of implementation, and results are as shown in FIG. 10, herein two lines of distributed and fixed alignment modes are overlapped. Generally, the performance of the Max-SINR iterative solution is optimal, and the performance of the solution of this embodiment is superior to the performance of the distributed IA iterative algorithm and the fixed alignment mode, and when SINR=30 dB, the performance of this solution is improved by about 2 bps/Hz. With the increase of SINR, the performance of the solution of this embodiment is gradually close to the performance of the Max-SINR iterative solution. Besides, it can also be seen that the sum rate obtained by fixing alignment modes of two terminals is comparatively close to the sum rate obtained by unfixing the alignment modes of the terminals, but the search set S is decreased by about 10 times and the calculation complexity can be greatly reduced after the two terminals are fixed. Therefore, the solution of fixing the alignment modes of partial terminals and then selecting the alignment modes of other terminals based on the chordal distance criterion is a comparatively preferred solution.

Application Example 2

In another application example, by adopting the same scenario and the same steps of solving the optimal partial interference alignment mode, after four base stations transmit signals to four terminals by adopting a precoding matrix group $\langle V_1, V_2, V_3, V_4 \rangle_{opt}$ corresponding to the optimal alignment mode, the receiving ends (terminals) may perform system sum rate performance comparison by adopting receiving algorithms which are respectively a zero forcing algorithm and an MMSE algorithm.

After step S406, the method further includes steps for calculating the system sum rate under an ideal CSI condition, including:
In S407b, a receiving matrix $U_k$ is solved at the receiving end;
(a) ZF receiving algorithm
firstly let $H_1 = [H_{12}V_2, H_{13}V_3, H_{14}V_4]$ $H_2 = [H_{21}V_1, H_{23}V_3, H_{24}V_4]$ $H_3 = [H_{31}V_1, H_{32}V_2, H_{34}V_4]$ $H_4 = [H_{41}V_1, H_{42}V_2, H_{43}V_3] \quad (20)$ then SVD (Singular Value Decomposition) is performed on a matrix $H_k$ to obtain $$H_k = [\overline{U}_k \quad \tilde{U}_k] \begin{bmatrix} \Sigma_k & \\ & 0 \end{bmatrix} \begin{bmatrix} \overline{V}_k^H \\ \tilde{V}_k^H \end{bmatrix}$$

and a zero-forcing receiving matrix is taken as:

$$U_k^{ZF} = \tilde{U}_k \quad (21)$$

(b) MMSE receiving algorithm
firstly let $$\hat{U}_k = \left( \sum_{j=1}^{4} \frac{P_j}{d_j} H_{kj} V_j V_j^H H_{kj}^H + I_M \right)^{-H} (H_{kk} V_k) \quad (22)$$

since $d_j = 1$ ($j=1, 2, 3, 4$), $\hat{U}_k$ is normalized to obtain $U_k^{MMSE}$ $$U_k^{MMSE} = \frac{\hat{U}_k}{\sqrt{\hat{U}_k^H \hat{U}_k}} \quad (23)$$

In S408b, the system sum rate is calculated, $$R_{sum} = \sum_{k=1}^{4} R_k = \sum_{k=1}^{4} \log \left| I_{d_k} + Q_{kk} \left( \sigma^2 I_{d_k} + \sum_{j=1,j\neq k}^{4} Q_{kj} \right)^{-1} \right| \quad (24)$$

herein $Q_{kj} = \frac{P_j}{d_j} U_k^H H_{kj} V_j V_j^H H_{kj}^H U_k$.

Figure 11:
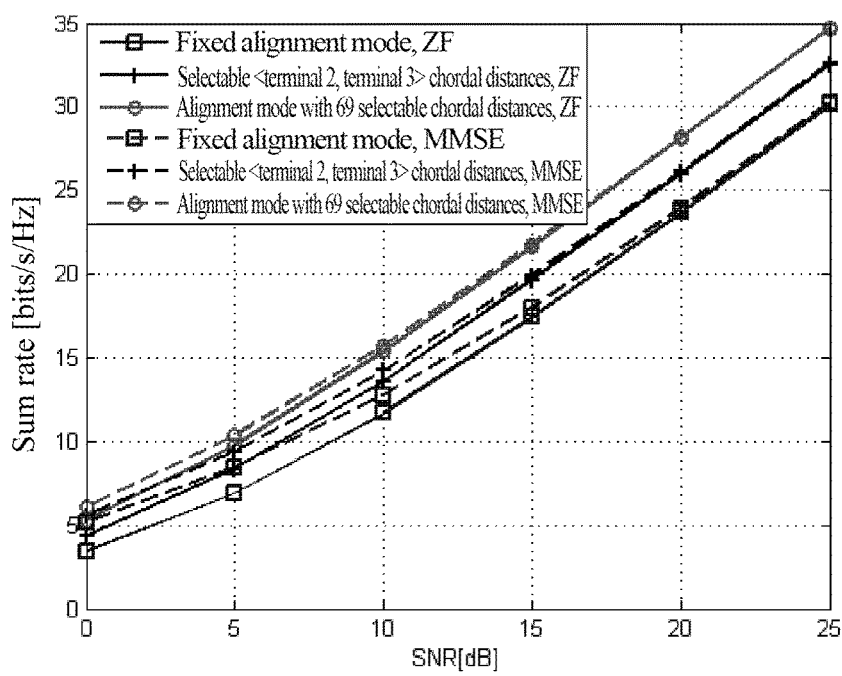
FIG. 11 is a schematic diagram of sum rate comparison of interference alignment modes based on a chordal distance criterion under different receiving algorithms.

Comparison is made by respectively using the zero-forcing algorithm and the MMSE algorithm as the receiving algorithm. Respectively 2000 times of independent simulation are performed on the fixed alignment solution and the alignment mode of fixing alignment modes of partial terminals (the alignment mode with selectable <terminal 2, terminal 3> chordal distances) and the alignment mode of unfixing the alignment modes of the terminals (the alignment mode with 69 selectable chordal distances) of this embodiment under the same channel condition. Results are as shown in FIG. 11. At low signal-noise ratio, the MMSE receiving algorithm is slightly superior to the ZF receiving algorithm. However, on the whole, the performance obtained by adopting the ZF receiving algorithm is close to the performance obtained by adopting the MMSE receiving algorithm. Besides, no matter which receiving algorithm is adopted, the sum rate performance obtained by selecting the alignment modes according to the maximum chordal distance criterion is superior to the sum rate performance obtained by adopting the fixed alignment mode.

Application Example 3

In another application example, the same scenario is adopted, K=4 cells are included, each cell serves one terminal and four base stations respectively and independently transmit $d_k$=2 (k=1, 2, 3, 4) data streams to corresponding target terminals. Each base station and each terminal in the cells are provided with M=6 antennas. $H_{kj}$ denotes a channel matrix (6×6 dimensions) from a base station in a cell j to a terminal in a cell k, and it is supposed that all elements of $H_{kj}$ are mutually independent and comply with complex Gaussian random distribution with zero-mean and unit variance. Transmitting power of each base station is $P_k$=P, receiving noise of each terminal is $n_k$ and noise power is $\sigma^{-2}$=1. Receiving signals $y_k$ of a kth terminal may be expressed as:

$$y_k = H_{kk}V_k x_k + \sum_{j=1, j \neq k}^{4} H_{kj}V_j x_j + n_k \quad (25)$$

herein $x_j$ is a signal vector transmitted by a base station in cell j, $V_j$ (6×2 dimensions) is transmission precoding matrix of a base station in cell j and a norm of each column thereof is 1.

Figure 12:
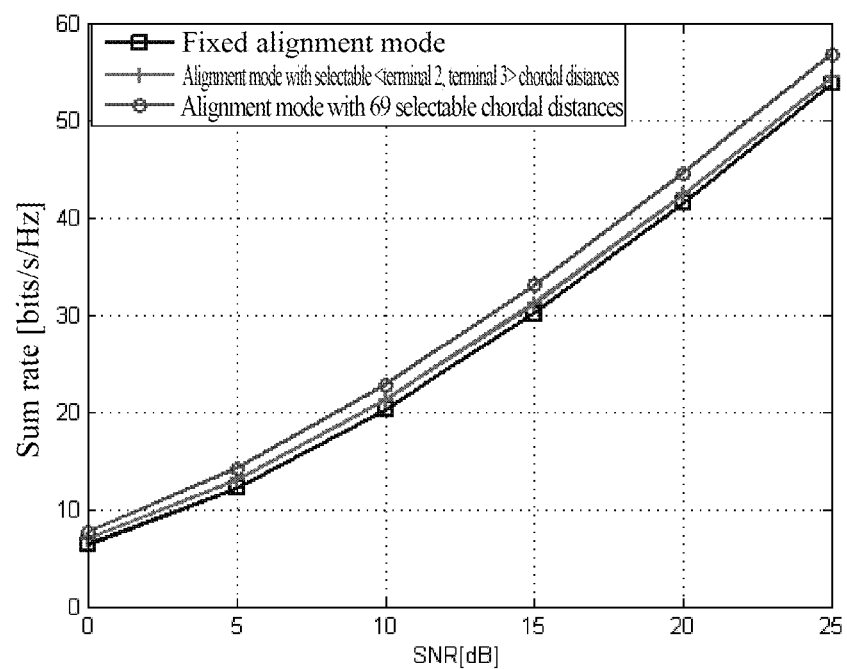
FIG. 12 is a schematic diagram of sum rate performance in alignment modes based on a chordal distance criterion when a data stream number d=2 and an antenna number M=6.

The same steps of solving the optimal partial interference alignment mode and calculating the system sum rate as steps S301-S406 and S401-S408a are adopted, and respectively 2000 times of independent simulation are performed by adopting the fixed alignment solution and the alignment mode of unfixing terminals (the alignment mode with 69 selectable chordal distances) and the alignment mode of fixing part of terminals (the alignment mode with 7 selectable chordal distances) of this embodiment under the same channel condition. Results are as shown in FIG. 12. When an antenna number M=6, the antenna number satisfies the condition of fully recovering d-dimension desired signals. From FIG. 12, it can be seen that, under the situation of multiple data streams, the performance obtained by fixing alignment modes of partial terminals and selecting alignment modes of remaining terminals according to a chordal distance criterion is superior to the sum rate performance obtained by adopting the fixed alignment mode.

Application Example 4

Figure 13:
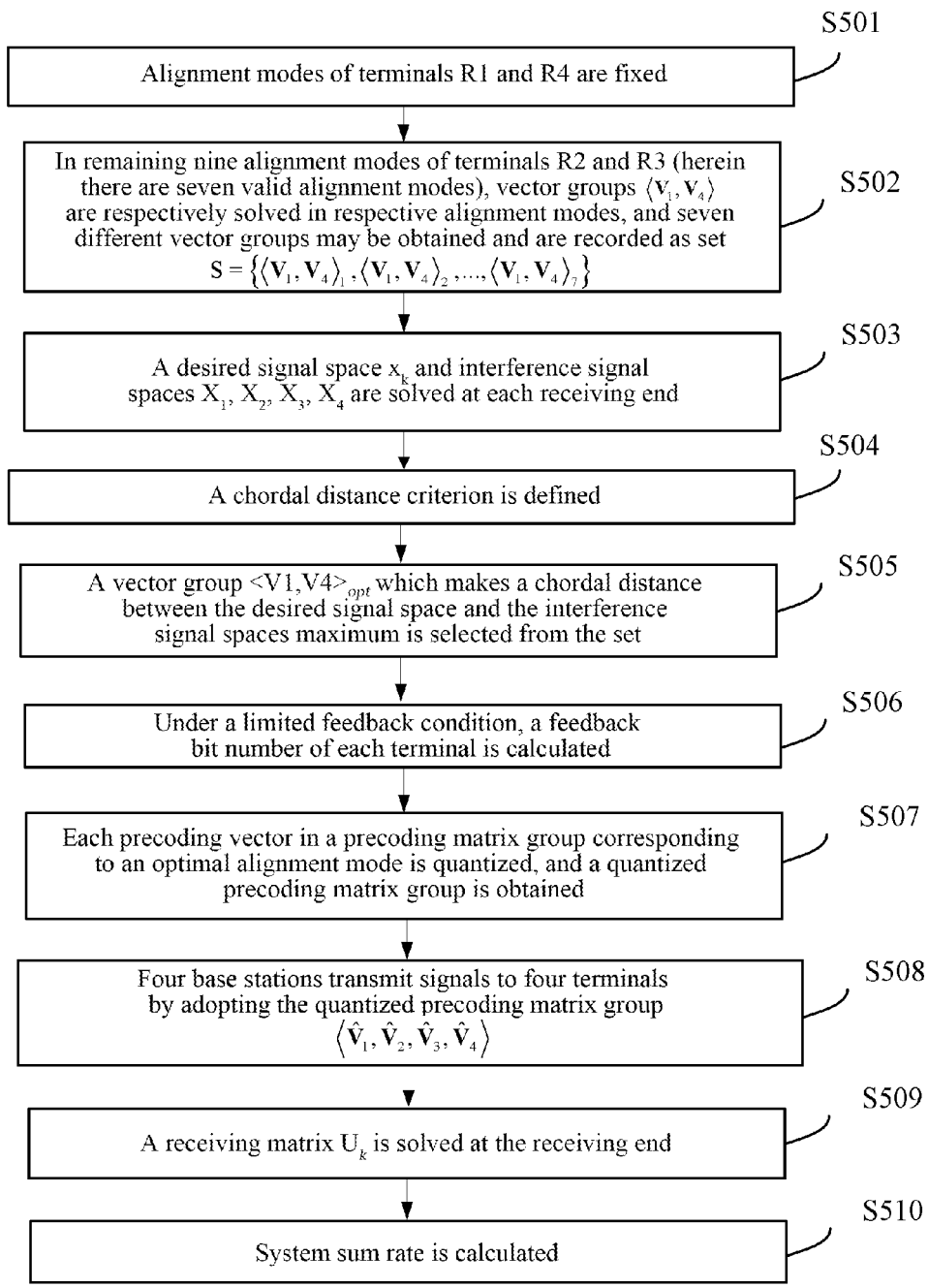
FIG. 13 is a flowchart of a coordinated beamforming method based on partial interference alignment in application example 4.

The same scenario and interference channel system as application example 1 are adopted. A flow of a coordinated beamforming method based on partial interference alignment of this embodiment under a limited feedback condition will be further described below in combination with FIG. 13:

In S501, alignment modes of terminals $R_1$ and $R_4$ are fixed:

span($H_{12}V_2$)=span($H_{13}V_3$) at user 1 span($H_{42}V_2$)=span($H_{43}V_3$) at user 4 \quad (26)

the results are obtained by solving:

$V_3$=d eigenvectors of $((H_{43})^{-1}H_{42}(H_{12})^{-1}H_{13})$ $V_2 = (H_{12})^{-1}H_{13}V_3$ \quad (27)

herein span(X) denotes a vector space spanned by each column of matrix X.

In S502, in remaining nine alignment modes of terminals $R_2$ and $R_3$ (herein there are seven valid alignment modes), vector groups $\langle V_1, V_4 \rangle$ are solved respectively in respective alignment modes, herein seven different vector groups may be obtained and are recorded as set S={$\langle V_1, V_4 \rangle$, $\langle V_1, V_4 \rangle_2$, ..., $\langle V_1, V_4 \rangle_7$} and each vector group corresponds to one alignment mode.

In S503, a desired signal space and interference signal spaces are solved at each receiving end;

$x_k = [H_{kk}V_k](k=1,2,3,4)$ \quad (28)

$X_1 = [H_{12}V_2, H_{13}V_3, H_4V_4]$ $X_2 = [H_{21}V_1, H_{23}V_3, H_{24}V_4]$ $X_3 = [H_{31}V_1, H_{32}V_2, H_{34}V_4]$ $X_4 = [H_{41}V_1, H_{42}V_2, H_{43}V_3]$ \quad (29)

In S504, a chordal distance criterion is defined, for m×$n_1$-dimension matrix $X_1$ and m×$n_2$-dimension matrix $X_2$ (m≥n1,n2), the chordal distance expression is:

$$d(X_1, X_2) = \frac{1}{\sqrt{2}} \|O(X_1)O(X_1)^H - O(X_2)O(X_2)^H\|_F \quad (30)$$

$$= \sqrt{\frac{n_1 + n_2}{2} - \|O(X_1)^H O(X_2)\|_F}$$

herein O(X) denotes a matrix consisting of orthogonal basis vectors of column spaces of matrix X.

In S505, a vector group which makes a chordal distance between the desired signal space and the interference signal space maximum is selected from the set S;

$$\langle V_1, V_4 \rangle_{opt} = \underset{\langle V_1, V_4 \rangle \in S}{\operatorname{argmax}} \{d(x_1, X_1) + d(x_2, X_2) + d(x_3, X_3) + d(x_4, X_4)\} \quad (31)$$

formula (31) is solved here by adopting an exhaustive search way.

In S506, a feedback bit number of each terminal is calculated under a limited feedback condition;

$$equal = \frac{B_T}{K} = \frac{16}{4} = 4 \quad (32)$$

(a) when Δa=0, a equal number of bits are allocated to each terminal, $B_1$=equal−Δα=4, $B_2$=equal+Δα=4, $B_3$=equal+Δα=4, $B_4$=equal−Δα=4 \quad (33)

(b) when Δa=2, $B_1$=equal−Δα=2, $B_2$=equal+Δα=6, $$B_3=\text{equal}+\Delta\alpha=6, B_4=\text{equal}-\Delta\alpha=2 \quad (34)$$

(c) when $\Delta\alpha=\text{equal}=4$, $$B_1=\text{equal}-\Delta\alpha=0, B_2=\text{equal}+\Delta\alpha=8,$$

$$B_3=\text{equal}+\Delta\alpha=8, B_4=\text{equal}-\Delta\alpha=0 \quad (35)$$

herein $B_T$ denotes total feedback bit number of terminals, $B_1$, $B_2$, $B_3$ and $B_4$ respectively denote bit numbers allocated to terminals $R_1$, $R_2$, $R_3$ and $R_4$, and $\Delta a$ denotes difference between the numbers of bits allocated to terminals.

According to $B_k$ ($k=1, 2, 3, 4$), a codebook set used by the kth ($k=1, 2, 3, 4$) base station-terminal can be determined and the codebook set is recorded as $W_k=\{\hat{v}_1, \ldots, \hat{v}_{2^{B_k}}\}$ ($k=1, 2, 3, 4$).

In S507, when data stream $d=1$, each precoding vector in a precoding matrix group $\langle V_1, V_2, V_3, V_4 \rangle$ corresponding to an optical alignment mode is quantized to obtain a quantized precoding matrix group $\langle \hat{V}_1, \hat{V}_2, \hat{V}_3, \hat{V}_4 \rangle$;

$$\hat{V}_k = \hat{v}_k = \underset{\hat{v}_i \in W}{\arg\min} s^2(V_k, \hat{v}_i) \quad (36)$$

herein $W_k=\{\hat{v}_1, \ldots, \hat{v}_{2^{B_k}}\}$, $s(V_k, \hat{v}_i)=\sqrt{1-|V_k^H \hat{v}_i|^2}$.

$s(V_k, \hat{v}_i)=\sqrt{1-|V_k^H \hat{v}_k|^2}$ denotes Euclidean distance between vectors $V_k$ and $\hat{v}_i$, $W_k=\{\hat{v}_1, \ldots, \hat{v}_{2^{B_k}}\}$ ($k=1, 2, 3, 4$) denotes the codebook set, $\hat{v}_i$ denotes an element in $W_k$, totally the number of the elements is $2^{B_k}$, and $B_k$ denotes the feedback bit number allocated to terminal k.

The terminal k compares a real precoding $V_k$ with each element in $W_k$, selects an element closest to $V_k$ to replace $V_k$ and feeds a serial number of the selected element (i.e., a PMI, 1, or 2, or . . . or $2^{B_k}$) back to inform the base station, and only the serial number is needed to be fed back, and thus the base station can know that which codebook element is selected by the terminal according to the received serial number (the codebook has already been known by both two ends). This process is called as quantization. Quantization greatly reduces the amount of feedback brought by the ideal CSI, and this is called as limited feedback.

In S508, four base stations transmit signals to four terminals by adopting the quantized precoding matrix group $\langle \hat{V}_1, \hat{V}_2, \hat{V}_3, \hat{V}_4 \rangle$;

In S509, a receiving matrix $\hat{U}_k$ is solved at the receiving end under the limited feedback condition; firstly let $$H_1=[H_{12}\hat{V}_2, H_{13}\hat{V}_3, H_{14}\hat{V}_4],$$

$$H_2=[H_{21}\hat{V}_1, H_{23}\hat{V}_3, H_{24}\hat{V}_4],$$

$$H_3=[H_{31}\hat{V}_1, H_{32}\hat{V}_2, H_{34}\hat{V}_4],$$

$$H_4=[H_{41}\hat{V}_1, H_{42}\hat{V}_2, H_{43}\hat{V}_3]. \quad (37)$$

then SVD (Singular Value Decomposition) is performed on matrix $H_k$ to obtain $$H_k = [\overline{U}_k \ \tilde{U}_k] \begin{bmatrix} \Sigma_k \\ 0 \end{bmatrix} \begin{bmatrix} \overline{V}_k^H \\ \tilde{V}_k^H \end{bmatrix}$$

and a zero-forcing receiving matrix is taken as:

$$\hat{U}_k = \tilde{U}_k \quad (38)$$

In S510, the system sum rate is calculated.

$$R_{sum} = \sum_{k=1}^{4} R_k = \sum_{k=1}^{4} \log \left| I_{d_k} + Q_{kk}\left(\sigma^2 I_{d_k} + \sum_{j=1, j\neq k}^{4} Q_{kj}\right)^{-1} \right| \quad (39)$$

herein $Q_{kj} = \frac{P_j}{d_j} \hat{U}_k^H H_{kj} \hat{V}_j \hat{V}_j^H H_{kj}^H \hat{U}_k$.

Figure 14:
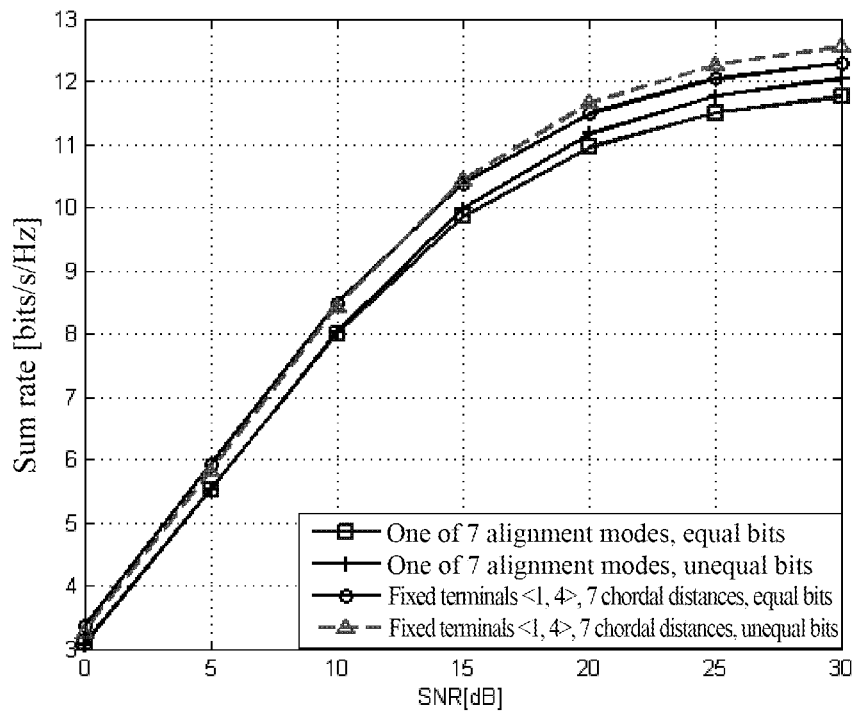
FIG. 14 is a schematic diagram of sum rate performance when a data stream number d=1, a total feedback bit number $B_T$=16 and a bit difference $\Delta d$=2 in application example 4.
Figure 15:
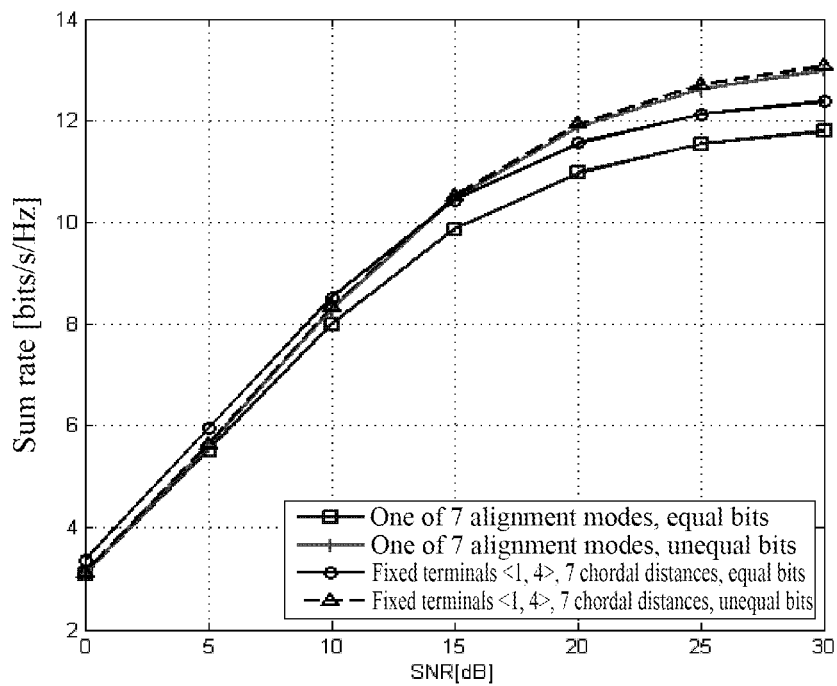
FIG. 15 is a schematic diagram of sum rate performance when a data stream number d=1, a total feedback bit number $B_T$=16 and a bit difference $\Delta d$=4 in application example 4.

Respectively 2000 times of independent simulation are performed by adopting the solution of one of 7 valid alignment modes and the solution of chordal distance under the same channel condition. Results are as shown in FIG. 14 and FIG. 15. From the two figures, it can be seen that, in one aspect, when $\Delta d$ is an extreme value of $\Delta d$=equal, the chordal distance selection solution has already lost the effect of maximizing the chordal distance between the desired signal subspace and the interference signal subspace, thereby the alignment mode is degraded to a common alignment mode; or in other words, quantization has a very great influence on interference alignment and the amplitude of performance improvement brought by the solution of the chordal distance is decreased with the decrease of quantization accuracy.

In another aspect, regardless the value of $\Delta d$, the two-step optimization solution, i.e., "fixed terminals <1, 4>, 7 chordal distances, unequal bits" still obtains the optimal curve of the four curves. Only when $\Delta d$=equal=4, the performance obtained thereby is extremely similar to the performance obtained by adopting the solution "one of 7 alignment modes, unequal bits". It should be noted that 8 bits are allocated to each of <terminal 2, terminal 3> and 0 bit is allocated to <terminal 1, terminal 4>, i.e., precoding vectors are randomly generated.

Aiming at the four-terminal scenario, if the selected optimal partial interference alignment mode has the following characteristic: interferences from <terminal c, terminal d> are aligned to one space at <terminal a, terminal b>, more bits are allocated to <terminal c, terminal d>. As found by simulation (FIG. 15), when bits are allocated to <terminal c, terminal d> only and are not allocated to <terminal a, terminal b>, the performance of the system is very good. In other words, the sum rate performance of the system is close to the optimal performance as long as the bits are allocated to partial users and are not allocated to other terminals, and the complexity caused by chordal distance selection is avoided. In this embodiment, as shown in FIG. 6, in both figures, interferences from <base station 2, base station 3> are aligned to one space at <terminal 1, terminal 4>, thus more bits are allocated to <terminal 2, terminal 3>, and the difference is that the optimal alignment mode needs to be firstly selected in FIG. 6(a) while the alignment modes of all terminals have already been determined in FIG. 6(b).

According to the coordinated beamforming method and apparatus based on partial interference alignment provided by the embodiment of the present document, in one aspect, firstly a precoding matrix group corresponding to an optimal alignment mode is selected from different partial interference alignment modes according to a chordal distance criterion to transmit signals, the receiving intensity of desired signals is improved on the premise of guaranteeing compression of an interference subspace and thus the purpose of effectively improving system sum rate is achieved; and in another aspect, limited feedback design based on a partial interference alignment solution is effectively performed, and bit allocation to terminals is adaptively performed according to the selected alignment mode to minimize performance loss caused by quantization.

One ordinary skilled in the art can understand that all or partial steps in the above-mentioned methods can be completed by relevant hardware instructed by a program, and the program can be stored in a computer readable storage medium such as a read only memory, a magnetic disk or a compact disk, etc. Alternatively, all or partial steps of the above-mentioned embodiments can also be implemented by using one or more integrated circuits. Correspondingly, each module/unit in the above-mentioned embodiments can be implemented by means of hardware, and can also be implemented by means of a software function module. The present document is not limited to combinations of hardware and software in any specific form.

The above-mentioned embodiments are just preferred embodiments of the present document and are not used for limiting the protection range of the present document. According to the invention contents of the present document, various other embodiments can be obtained. One skilled in the art can make various corresponding modifications and variations according to the present document without departing from the rule and essence of the present document. Any modification, equivalent replacement, improvement and the like made within the essence and principle of the present document shall also be included in the protection range of the present document.

INDUSTRIAL APPLICABILITY

According to the embodiment of the present document, in one aspect, the receiving intensity of desired signals is improved on the premise of guaranteeing compression of an interference subspace, and thus the purpose of effectively improving system sum rate is achieved; and in another aspect, limited feedback design based on a partial interference alignment solution is effectively performed, and bit allocation to terminals is adaptively performed according to the selected alignment mode to minimize performance loss caused by quantization.

What we claim is:

1. A coordinated beamforming method based on partial interference alignment, comprising:
    selecting an optimal partial interference alignment mode from selectable partial interference alignment modes of terminals covered by base stations in a coordinating cluster of a coordinated multiple points transmission according to a chordal distance criterion; and
    transmitting, by the base stations, signals to the terminals by adopting the optimal partial interference alignment mode,
    wherein selecting an optimal partial interference alignment mode from selectable partial interference alignment modes of terminals covered by base stations in a coordinating cluster of a coordinated multiple points transmission according to a chordal distance criterion comprises:
    respectively calculating precoding matrixes of each terminal in different partial interference alignment modes, wherein the precoding matrixes of the terminals in the same partial interference alignment mode form a precoding matrix group, one partial interference alignment mode corresponds to one precoding matrix group; and
    selecting a precoding matrix group corresponding to the optimal partial interference alignment mode from all precoding matrix groups according to the chordal distance criterion; and
    transmitting, by the base stations, signals to the terminals by adopting the optimal partial interference alignment mode comprises:
    transmitting, by the base stations, the signals to the terminals by adopting the precoding matrix group corresponding to the optimal partial interference alignment mode,
    wherein the partial interference alignment mode refers to aligning a portion of base station interferences and not aligning all base station interferences of the terminals to one space, such that total interference space dimensions are reduced from original $(K-1)d$ to $(K-2)d$, where K, is an integer greater than 3 and d is a corresponding data stream.

2. The method according to claim 1, wherein:
    selecting a precoding matrix group corresponding to the optimal partial interference alignment mode from all precoding matrix groups according to the chordal distance criterion comprises:
    selecting a precoding matrix group which makes a chordal distance between a desired signal subspace and an interference signal subspace maximum from all precoding matrix groups as the precoding matrix group corresponding to the optimal partial interference alignment mode.

3. The method according to claim 1, wherein:
    selecting the optimal partial interference alignment mode from selectable partial interference alignment modes of terminals covered by base stations in a coordinating cluster of a coordinated multiple points transmission according to the chordal distance criterion comprises:
    fixing partial interference alignment modes of partial terminals covered by the base stations in the coordinating cluster of the coordinated multiple points transmission, and calculating a precoding matrix of each terminal in each partial interference alignment mode in combination with unfixed partial interference alignment modes of other terminals covered by the base stations, wherein the precoding matrixes of the terminals in the same partial interference alignment mode form a precoding matrix group, one partial interference alignment mode corresponds to one precoding matrix group; and selecting a precoding matrix group corresponding to the optimal partial interference alignment mode from all precoding matrix groups according to the chordal distance criterion; and
    transmitting, by the base stations, signals to the terminals by adopting the optimal partial interference alignment mode comprises:
    transmitting, by the base stations, the signals to the terminals by adopting the precoding matrix group corresponding to the optimal partial interference alignment mode.

4. The method according to claim 3, wherein, after selecting the optimal partial interference alignment mode according to the chordal distance criterion, the method further comprises:
    performing bit allocation to the terminals according to the optimal partial interference alignment mode, and according to bits allocated to a corresponding terminal, determining a codebook set of a precoding matrix used by a base station to which the terminal belongs, quantizing the precoding matrix group corresponding to the optimal partial interference alignment mode according to the codebook set, and transmitting the signals to the terminals by adopting the quantized precoding matrix group.

5. The method according to claim 1, wherein, after selecting the optimal partial interference alignment mode according to the chordal distance criterion, the method further comprises:
performing bit allocation to the terminals according to the optimal partial interference alignment mode, and according to bits allocated to a corresponding terminal, determining a codebook set of a precoding matrix used by a base station to which the terminal belongs, quantizing the precoding matrix group corresponding to the optimal partial interference alignment mode according to the codebook set, and transmitting the signals to the terminals by adopting the quantized precoding matrix group.

6. The method according to claim 5, wherein:
performing bit allocation to the terminals according to the optimal partial interference alignment mode comprises:
in the optimal partial interference mode, if there are terminals which align the same two base station interferences to one space, allocating a greater number of bits to the terminals covered by the same two base stations than a number of bits allocated to the terminals covered by other base stations, and if there are no terminals which align the same two base station interferences to one space, respectively allocating an equal number of bits to the terminals.

7. The method according to claim 1, wherein:
there are K base stations in the coordinating cluster of the coordinated multiple points transmission, wherein each base station serves one terminal, each base station and each terminal respectively comprise M antennas, and the K base stations respectively and independently transmit $d_k$ data streams to the terminals, wherein k=1, 2, ... K, a number of the antennas is at least M=(K−2)$d_k$+$d_k$, K is an integer greater than 3, $d_k$ is an integer greater than or equal to 1 and less than or equal to M/(K−1), and "/" denotes division operation.

8. A non-transitory computer readable medium comprising program instructions, which, when executed by each base station among a number of base stations, enable the base station to: select an optimal partial interference alignment mode from selectable partial interference alignment modes of terminals covered by base stations in a coordinating cluster of a coordinated multiple points transmission according to a chordal distance criterion; and
transmit, by the base stations, signals to the terminals by adopting the optimal partial interference alignment mode,
wherein selecting an optimal partial interference alignment mode from selectable partial interference alignment modes of terminals covered by base stations in a coordinating cluster of a coordinated multiple points transmission according to a chordal distance criterion comprises:
respectively calculate precoding matrixes of each terminal in different partial interference alignment modes, wherein the precoding matrixes of the terminals in the same partial interference alignment mode form a precoding matrix group, one partial interference alignment mode corresponds to one precoding matrix group; and
select a precoding matrix group corresponding to the optimal partial interference alignment mode from all precoding matrix groups according to the chordal distance criterion; and
transmit, by the base stations, signals to the terminals by adopting the optimal partial interference alignment mode comprises:
transmit, by the base stations, the signals to the terminals by adopting the precoding matrix group corresponding to the optimal partial interference alignment mode,
wherein the partial interference alignment mode refers to aligning a portion of base station interferences and not aligning all base station interferences of the terminals to one space, such that total interference space dimensions are reduced from original (K−1)d to (K−2)d, where K, is an integer greater than 3 and d is a corresponding data stream.

9. A coordinated beamforming apparatus based on partial interference alignment, comprising hardware performing instructions stored in a non-transitory computer readable medium which executes steps in following modules:
a selection module configured to select an optimal partial interference alignment mode from selectable partial interference alignment modes of terminals covered by base stations in a coordinating cluster of a coordinated multiple points transmission according to a chordal distance criterion; and
a transmission module configured to transmit signals to the terminals by adopting the optimal partial interference alignment mode,
wherein the selection module is configured to select the optimal partial interference alignment mode from the selectable partial interference alignment modes of the terminals covered by the base stations in the coordinating cluster of the coordinated multiple points transmission according to the chordal distance criterion through the following way:
respectively calculating precoding matrixes of each terminal in different partial interference alignment modes, wherein the precoding matrixes of the terminals in the same partial interference alignment mode form a precoding matrix group, one partial interference alignment mode corresponds to one precoding matrix group; and
selecting a precoding matrix group corresponding to the optimal partial interference alignment mode from all precoding matrix groups according to the chordal distance criterion; and
the transmission module is configured to transmit the signals to the terminals by adopting the optimal partial interference alignment mode through the following way:
transmitting the signals to the terminals by adopting the precoding matrix group corresponding to the optimal partial interference alignment mode,
wherein the partial interference alignment mode refers to aligning a portion of base station interferences and not aligning all base station interferences of the terminals to one space, such that total interference space dimensions are reduced from original (K−1)d to (K−2)d, where K, is an integer greater than 3 and d is a corresponding data stream.

10. The apparatus according to claim 9, wherein:
the selection module is configured to select the precoding matrix group corresponding to the optimal partial interference alignment mode from all precoding matrix groups according to the chordal distance criterion through the following way:
selecting the precoding matrix group which makes a chordal distance between a desired signal subspace and an interference signal subspace maximum from all precoding matrix groups as the precoding matrix group corresponding to the optimal partial interference alignment mode.

11. The apparatus according to claim 9, wherein:

the selection module is configured to select the optimal partial interference alignment mode from the selectable partial interference alignment modes of the terminals covered by the base stations in the coordinating cluster of the coordinated multiple points transmission according to the chordal distance criterion through the following way:

fixing partial interference alignment modes of partial terminals covered by the base stations in the coordinating cluster of the coordinated multiple points transmission, and calculating a precoding matrix of each terminal in each partial interference alignment mode in combination with unfixed partial interference alignment modes of other terminals covered by the base stations, wherein the precoding matrixes of the terminals in the same partial interference alignment mode form the precoding matrix group, one partial interference alignment mode corresponds to one precoding matrix group; and selecting the precoding matrix group corresponding to the optimal partial interference alignment mode from all precoding matrix groups according to the chordal distance criterion; and the transmission module is configured to transmit the signals to the terminals by adopting the optimal partial interference alignment mode through the following way:

transmitting the signals to the terminals by adopting the precoding matrix group corresponding to the optimal partial interference alignment mode.

12. The apparatus according to claim 11, wherein the apparatus further comprises:

a bit allocation module configured to perform bit allocation to the terminals according to the optimal partial interference alignment mode, and according to bits allocated to a corresponding terminal, determine a codebook set of the precoding matrix used by a base station to which the terminal belongs, quantize the precoding matrix group corresponding to the optimal partial interference alignment mode according to the codebook set, and transmit the signals to the terminals by adopting the quantized precoding matrix group; and the transmission module is further configured to transmit the signals to the terminals by adopting the quantized precoding matrix group.

13. The apparatus according to claim 9, wherein the hardware, when performing the instructions stored in the non-transitory computer readable medium, further executes steps in a following module:

a bit allocation module configured to perform bit allocation to the terminals according to the optimal partial interference alignment mode, and according to bits allocated to a corresponding terminal, determine a codebook set of a precoding matrix used by a base station to which the terminal belongs, quantize the precoding matrix group corresponding to the optimal partial interference alignment mode according to the codebook set, and transmit the signals to the terminals by adopting the quantized precoding matrix group; and the transmission module is further configured to transmit the signals to the terminals by adopting the quantized precoding matrix group.

14. The apparatus according to claim 13, wherein:

the bit allocation module is configured to perform bit allocation to the terminals according to the optimal partial interference alignment mode through the following way:

in the optimal partial interference mode, if there are terminals which align the same two base station interferences to one space, allocating a greater number of bits to the terminals covered by the same two base stations than a number of bits allocated to the terminals covered by other base stations, and if there are no terminals which align the same two base station interferences to one space, respectively allocating an equal number of bits to the terminals.

* * * * *